United States Patent

Rawson et al.

[15] 3,703,810
[45] Nov. 28, 1972

[54] SPEED CONTROL APPARATUS

[72] Inventors: James L. Rawson; Leslie E. Rawson, both of P. O. Box 217, Atkins, Iowa 52206

[22] Filed: Oct. 14, 1970

[21] Appl. No.: 80,558

[52] U.S. Cl. .................................................60/97 S
[51] Int. Cl. .........................F01b 21/04, F01l 33/02
[58] Field of Search.........................................60/97 S

[56] References Cited

UNITED STATES PATENTS

| 2,252,545 | 8/1941 | Benz | 60/97 S |
| 2,307,334 | 1/1943 | Peek | 60/97 S |
| 2,301,434 | 11/1942 | McNeil | 60/97 S |
| 2,329,216 | 9/1943 | Peters | 60/97 S |

FOREIGN PATENTS OR APPLICATIONS 675,406  7/1952  Great Britain..............60/97 S

*Primary Examiner*—Martin P. Schwadron
*Assistant Examiner*—Allen M. Ostrager
*Attorney*—Haven E. Simmons and James C. Nemmers

[57] ABSTRACT

A control apparatus for synchronizing the speed of a rotating member with a variable speed input or for producing angular displacement of an output shaft in response to an input signal. The apparatus achieves correlation between the input and output by the use of a mechanical gear arrangement between the input and output shafts which arrangement produces angular displacement of a control member upon receipt of an input pulse or up variation of the speed of the input shaft from the output shaft. This displacement is then utilized to regulate an electrical speed control device, the flow to a hydraulic actuator, or a mechanical variable speed drive which adjusts the speed or displacement of the output shaft accordingly.

9 Claims, 2 Drawing Figures

PATENTED NOV 28 1972 3,703,810

INVENTORS
JAMES L. RAWSON
LESLIE E. RAWSON
BY James C. Nemmers
ATTORNEY

SPEED CONTROL APPARATUS

BACKGROUND OF THE INVENTION

There exists in the prior art many control systems in which the speed or movement of a member is controlled in response to the movement or variation in speed of another member. Such control systems and devices have a wide range of applications, and the prior art reveals a number of quite sophisticated, complex systems for very accurately achieving this result. Some of the speed control devices are hydraulic, some electrical, electrohydraulic or electromechanical while still others are pneumatic. There exists a need, however, in many applications for an all mechanical speed control device which can be used where sources of pneumatic, hydraulic or electrical power are limited or not available. For example, a mechanical speed control device is very useful in synchronizing the speed of attachments, accessories, etc. for agricultural and construction equipment since these attachments, etc. are normally remotely located from the main power source. In the agricultural and construction machinery fields, there are, therefore, numerous applications where a simple, efficient mechanical speed control device is needed. For instance, an all mechanical speed control device can be used to regulate the speed of dispensing mechanisms for liquids and solids in synchronization with the vehicle ground speed. The prior art arrangements do not disclose a simple mechanical device which can be produced at a reasonable cost, will require a minimum of maintenance but which will serve efficiently in these agricultural and construction equipment applications. Because the operators of such equipment are often not highly trained technicians, and frequently work in remote locations, maintenance is a very important factor. As a result, equipment that requires little or no maintenance and which has a relatively long useful life is in demand and of great value.

Our novel device has many other uses in a variety of applications such as numerically controlled machine tools where the input logic is either continuous or stepped. Moreover, when used to synchronize the speed of a hydraulic motor or to produce angular displacement of its output shaft using a spool-type control valve, the control devices of the prior art all require an intermediate or pilot control which may be either a separate valve or built into the main valve. The intermediate control valve is necessary to minimize the input energy and increase the linearity of the output from the main control valve. Using the principles of our invention, a control device can be constructed as an analog device and the need for and cost of an intermediate stage is eliminated while the input energy required is further decreased from that required by comparable prior art devices.

SUMMARY OF THE INVENTION

The invention provides a very simple arrangement in which rotating members, such as gears, are utilized to produce angular displacement of a control or idler arm, in response to an input signal, this displacement being utilized to control an electrical speed control device, a hydraulic actuator, a mechanical variable speed drive, etc. This all mechanical arrangement can be used in any system in which angular displacement can be utilized to operate a control device. Basically, the invention includes a resolving gear which is driven by two gears, one gear being directly connected to the "slave" shaft the output of which is to be controlled, and the second gear being connected and driven in ratio with the speed or displacement of the input shaft. This second gear, however, is movable about an axis that is not fixed and to which one end of the idler or control arm is also connected. Thus, if the relative speeds of the two gears vary, the second gear, which is rotatable about a movable axis, will move around the resolving gear carrying with it the control or idler arm. This angular displacement of the control or idler arm is then utilized to operate the hydraulic, electrical or mechanical control device which in turn controls the displacement or speed of the output or slave shaft.

DESCRIPTION OF THE PREFERRED EMBODIMENT

Figure 1:
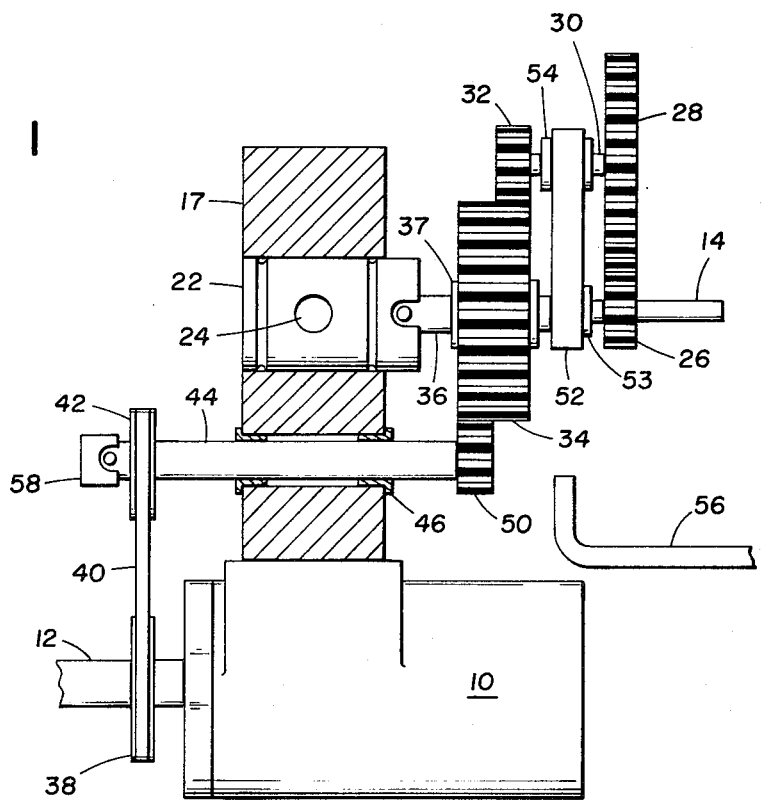
FIG. 1 is an elevation view, partly in section, of the apparatus of my invention as used in connection with a hydraulic motor.
Figure 2:
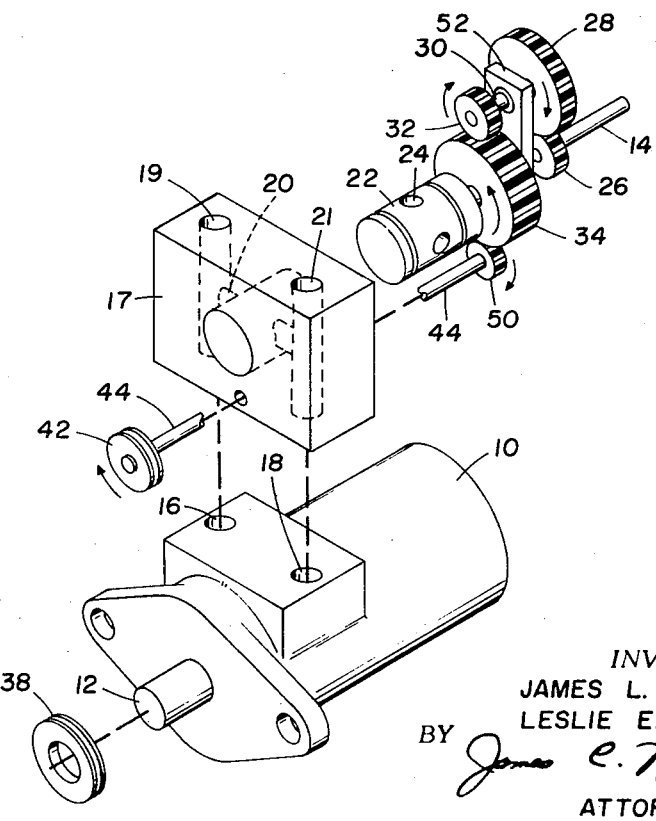
FIG. 2 is an exploded perspective view of the apparatus of my invention.

In the drawings, our invention is illustrated in connection with a hydraulic motor which drives the output or slave shaft. The control device of our invention is utilized in this instance to operate a throttle spool valve which controls the fluid flow to and from the hydraulic motor thereby controlling its speed or the displacement of its output shaft. It should be understood, however, that the invention can be applied to and used equally as effectively in systems in which an electric motor is controlled by a rheostat or other electrical speed control device or in a system in which the speed of the slave shaft is controlled by a mechanical variable speed drive.

Therefore, in the drawings, there is illustrated a hydraulic motor 10 having an output or slave shaft 12 the speed or displacement of which is to be correlated with the speed or displacement of an input shaft 14. It should be understood that the input shaft 14 may be connected to and driven by some other rotatable member in the system whose speed is to be synchronized with the slave shaft 12, or input shaft 14 may be connected to any device which produces angular displacement, such as an electrical stepper that is responsive to pulses or other signals from the input logic of the system. In other words, the input shaft 14 produces the input signal and may not necessarily be the component in the system which is to be correlated with the slave shaft 12. In the preferred embodiment, the speed or displacement of the slave shaft 12 is determined by the flow of hydraulic fluid to and from the motor 10 through input and output ports 16 and 18 respectively. The hydraulic motor 10 includes a manifold 17 containing inlet and outlet passages 19 and 21 respectively. A closed loop hydraulic system is thus provided, and the speed of the motor 10 is controlled by bypassing some of the input fluid directly to the output port 18 through a bypass passage 20 in the manifold 17. The amount of fluid bypassed determines the output of the hydraulic motor 10, and the amount of fluid bypassed is in turn controlled by a rotary spool valve 22 positioned in the manifold 17 and intercepting passageway 20. An axially movable spool valve could also be used with our novel control device, but as will become evident from the construction and operation of our device, a rotary spool valve simplifies the overall arrangement. As best seen in FIG. 1, the spool valve 22 contains a port or ports 24 the position of which controls the amount of fluid flow through the passage 20. When in the position shown in FIG. 1, a considerable amount of fluid is bypassed and the output of the motor 10 will decrease. As the throttle spool 22 is rotated from the position shown in FIG. 1, the amount of fluid flowing through the bypass passage 20 will be decreased depending upon the amount of angular movement of the spool valve 22. The output of the motor 10 will thus increase up to a maximum that is attained when valve 22 completely closes passage 20.

Affixed to and driven by the input shaft 14 is a small spur gear or pinion 26. Pinion 26 and the input shaft 14 are rotatable about a fixed axis, and the pinion 26 is engaged with and drives a larger spur gear 28 which is affixed to one end of a shaft 30. The axis of shaft 30 is not fixed, and at the end of shaft 30 opposite gear 28 is a small gear or control pinion 32. Control pinion 32 is in turn engageable with a resolving gear 34, which is rotatable about a shaft 36, but gear 34 is not affixed to shaft 36, bushing 37 separating them.

The slave shaft 12, which is driven by the hydraulic motor 10, has affixed to it a pulley 38. Belt 40 connects pulley 38 and a pulley 42 that is affixed to shaft 44. In the preferred embodiment, shaft 44 is rotatably mounted by means of bushings 46 in the manifold 17 of the hydraulic motor 10. At the opposite end of shaft 44 there is affixed a slave pinion 50 which is also engageable with the resolving gear 34. Slave pinion 50 and control pinion 32 have equal pitch diameters, and as best seen in FIG. 1 each has a face width of less than half the face width of resolving gear 34.

The throttle spool valve 32 is operatively connected to the shaft 36 which extends through and supports the resolving gear 34 as previously described. At the end of shaft 36 opposite the spool valve 22, there is affixed the lower end of an idler or control arm 52. The upper end of control arm 52 is affixed to the shaft 30 by means of bushing 54 so that shaft 30 can freely rotate with respect to the control arm 52. Thus, spool valve 22 is directly connected to control arm 52 through shaft 36.

If desired, input shaft 14 can be stabilized by extending it into a bushing 53 mounted in the lower end of control arm 52. In any event, the axis of shaft 14 must be colinear with the pivotal axis of arm 52 about shaft 36 as will be evident from the operation of the device.

Since the axis of shaft 30 is not fixed, shaft 30 can move through an arcuate path, the center of which is the axis of shaft 36. In an application where there is a continuous input producing rotation of shaft 14, if the speed of both the slave shaft 12 and the input shaft 14 remain constant, and if these speeds are in the predetermined ratio for which the specific gear train has been designed, the various gears will be driven as if this were a simple gear train. However, if the speed of the input shaft 14 should increase or decrease, the speed of the pinion 32 and gear 28 will decrease or increase proportionately. Since at this time the speed of the slave shaft 12 has not changed, the speed of the slave pinion 50 will be different than the speed of control pinion 32. Because these two pinions are of equal pitch diameter and are engageable with the same gear 34, the differential speed will cause the control pinion 32 to start moving around the resolving gear 34. When this occurs, shaft 30 will be moved along its arcuate path carrying with it the control arm 52 which in turn will cause angular displacement of shaft 36 thus rotating the throttle spool valve 22. As previously described, when the throttle spool valve 22 is rotated, the position of ports 24 relative to bypass passage 20 will be changed, thus changing the flow of hydraulic fluid to the hydraulic motor 10 and resulting in an increase or decrease in the speed of the slave shaft 12 in direct proportion to the change in speed of the input shaft 14. When the speed of the slave shaft 12 has thus been adjusted to the design ratio relative to the speed of the input shaft 14, the movement of the control arm 52 will stabilize.

The foregoing description of the operation of our novel control device applies also where the device is used to produce a predetermined angular displacement of slave shaft 12 in response to an input signal that produces angular displacement of input shaft 14. Obviously, if slave shaft 12 initially is stationary and input shaft 14 is rotated through a fixed angle, control arm 52 will be moved through an angle in a proportional amount. This in turn will rotate spool valve 22 to modify the flow to hydraulic motor 10 and produce a displacement of shaft 12. The displacement of slave shaft 12 will be "fed back" into the device by producing rotation of pinion 50 through a fixed angle. This will then cause movement of pinion 32 through gear 34 to return control arm 52 to its initial or "neutral" position.

It is important that our novel control device receive precise signals from the input shaft 14 and the slave shaft 12. The "lag" between receipt of a signal from shaft 14 and the resulting adjustments in the slave shaft 14 is a function of the angular displacement of control arm 52 required to cause the proper change. In experimental uses of our novel device, this angular displacement has not exceeded 5°. The hysteresis value can be changed by varying the ratio of pinion 26 and gear 28.

As previously noted, the resolving gear 34 has a face width greater than the combined face width of pinions 32 and 50, and the pinions 32 and 50 are offset to allow pinion 32 to clear pinion 50 in the event of a system malfunction and a resulting continuous 360° rotation of the control arm 52. If desired, a fail-safe trigger 56 may be provided in the path of the control arm 52 to produce a warning signal of a nonsynchronized condition so that the cause of the malfunction can be promptly corrected.

Continuous rotation of the control arm 52 will also cause on-off operation of the slave shaft 12. This is a useful characteristic which can be used as a signal that the system is not synchronized and corrective action should be taken.

If desired, a simple clutch 58 of any suitable type may be added to the drive between slave shaft 12 and shaft 44 so that the slave shaft 12 and input shaft 14 can be disconnected. This allows for manual adjustment and control of the system by rotation of input shaft 14.

It will be obvious to those skilled in the art that a system using the basic principles of the invention can be designed for any specific application depending upon the relative speeds desired between the slave shaft and the input shaft. The design of the individual gears will, of course, depend upon these desired speed ratios. It is essential, of course, to the operation of the system that the pinions 32 and 50 be of the same pitch diameter, but the design of the other gears will depend upon the ultimate result desired and the specific design requirements of the system in which the control arrangement is used. It will be further obvious to those skilled in the art that the shaft 36 could also be connected to a rheostat or other electrical control device for regulating the speed of an electric motor that drives the slave shaft, or shaft 36 could be connected to the control arm of a variable speed drive to regulate the speed of a slave shaft being driven by any suitable power source. Our novel system thus provides an extremely simple all-mechanical arrangement for controlling the speed of one shaft in response to an input signal from another rotating member whose speed it is desired to coordinate. The arrangement can be made at a relatively low cost and will require little or no maintenance. We have further found that our system is efficient, sensitive to minor speed variations and eliminates the "hunting" found in other speed control systems. Our system will stabilize itself very readily once the relative speed of the input and output shafts is also stabilized.

Particularly in hydraulic systems, conventional speed controls use a device in which fluid pressure on a piston is balanced against a spring which results in an unstable condition with much "hunting." Such devices are discrete controls which produce a stepped output from either an analog or a stepped input. Although this "hunting" of the stepped, discrete device can be minimized by refinements in the control and the use of pilot controls, these improvements are costly and require the continuous use of power to operate the control device. Our novel device is an analog device capable of handling a continuous or stepped input signal and producing a continuous analog output. Our device requires a small amount of power during a speed adjustment, but at all other times, the only power required is that necessary to idle the gear train in the device, and this power is very minimal. In every application in which our novel control device is used, the input power is very small because the input signal, whether continuous rotary or fixed displacement, is amplified by the gear train. In prior art systems, there is either no amplification or it must be accomplished through the use of pilot valves.

It will be further obvious to those skilled in the art that various revisions and modifications can be made in the specific design of the system as shown in the preferred embodiment disclosed herein. It is our intention, however, that all such revisions, modifications and variations which are obvious to those skilled in the art will be included within the scope of the following claims.

We claim:

1. In combination with a hydraulic motor having an output shaft and valve means having a movable operator regulating the fluid flow to and from said hydraulic motor to thereby control the rotation of said output shaft, a speed control apparatus for correlating the rotation of said shaft with that of a rotatable member, said apparatus comprising, a first circular member rotatable about an axis and operatively connected to said rotatable member, a second circular member rotatable about an axis and operatively connected so as to be rotatable with said first circular member, the axes of rotation of said first and second circular members being movable, a circular resolving member rotatable about an axis fixed in relation to said rotatable member, said resolving member being engageable with said second circular member and operatively connected to said output shaft so as to be rotatable in proportion to rotation of said shaft, and operating means pivotally mounted about an axis colinear with the fixed axis of said resolving member, said operating means being operatively connected to the axes of said first and second circular members so as to move said axes in a circular path about said pivotal axis when said means pivots, the operation of said valve means being directly mechanically connected to said operating means and operable by pivotal movement of said operating means to control the rotative movement of said output shaft.

2. The combination of claim 1 in which said first and second circular members and said resolving member are gears, and said operating means includes a control arm pivotally mounted at one end thereof, the other end of said arm being connected to the axes of said first and second circular members.

3. The combination of claim 2 in which said output shaft is operatively connected to said resolving gear by a third gear, and the face width of said resolving gear is greater than the combined face widths of said second and third gears, said second and third gears having the same pitch diameter, and said second gear engages said resolving gear along one edge thereof and said third gear engages said resolving gear along the other edge thereof so that said second gear can revolve completely around said resolving gear as said control arm pivots.

4. The combination of claim 3 in which there is provided indicator means actuated by pivotal movement of said control arm beyond a predetermined amount to indicate an abnormal condition in said apparatus.

5. The combination of claim 3 in which said first and second gears are affixed to and rotatable with the same shaft, and said shaft is turnable within the end of said control arm opposite to its pivotal end.

6. The combination of claim 5 in which said control arm is secured to and turnable with a shaft having a fixed axis, and said resolving gear is rotatably mounted on said shaft.

7. The combination of claim 6 in which the shaft of said control arm is directly mechanically connected to said control means.

8. The combination of claim 7 in which the operator of said valve means is a spool directly connected to and movable by said operating means, said spool also being connected to said output shaft through said speed control apparatus.

9. The combination of claim 1 in which the operator of said valve means is a spool directly connected to and movable by said operating means, said spool also being connected to said output shaft through said speed control apparatus.

* * * * *